(12) United States Patent
Granito et al.

(10) Patent No.: US 11,979,038 B2
(45) Date of Patent: May 7, 2024

(54) WIRELESS CHARGING ALIGNMENT

(71) Applicant: Google LLC, Mountain View, CA (US)

(72) Inventors: Gregory Granito, Palo Alto, CA (US); Katherine Blair Huffman, Menlo Park, CA (US)

(73) Assignee: GOOGLE LLC, Moutain View, CA (US)

( * ) Notice: Subject to any disclaimer, the term of this patent is extended or adjusted under 35 U.S.C. 154(b) by 450 days.

(21) Appl. No.: 16/295,064

(22) Filed: Mar. 7, 2019

(65) Prior Publication Data

US 2020/0287426 A1    Sep. 10, 2020

(51) Int. Cl.
*H02J 50/90* (2016.01)
*H02J 7/00* (2006.01)
*H02J 50/10* (2016.01)
*H02J 50/12* (2016.01)
*H04B 5/26* (2024.01)
*H04B 5/79* (2024.01)

(52) U.S. Cl.
CPC .......... *H02J 7/00034* (2020.01); *H02J 50/10* (2016.02); *H02J 50/12* (2016.02); *H02J 50/90* (2016.02); *H04B 5/26* (2024.01); *H04B 5/79* (2024.01); *H02J 2310/22* (2020.01)

(58) Field of Classification Search
CPC . H02J 50/90; H02J 50/12; H02J 7/025; H04B 5/0037; H04B 5/0081
See application file for complete search history.

(56) References Cited

U.S. PATENT DOCUMENTS 8,248,024 B2    8/2012  Yuan et al.
9,444,279 B1 *  9/2016  Brown ............... H02J 7/025
(Continued)

FOREIGN PATENT DOCUMENTS

EP    2713473 A2    4/2014

OTHER PUBLICATIONS

Gao, Y. et al. "Magnetic Alignment Detection Using Existing Charging Facility in Wireless EV Chargers." Jul. 31, 2015. Journal of Sensors, vol. 2016, Article ID 5670510. Hindawi Publishing Corporation. 9 pages.
(Continued)

*Primary Examiner* — Daniel Cavallari
*Assistant Examiner* — Brian K Baxter
(74) *Attorney, Agent, or Firm* — Botos Churchill IP Law LLP

(57) ABSTRACT

The technology provides for a system for determining wireless charging alignment. In this regard, one or more processors may receive motion data from one or more sensors of a computing device indicating a motion of the computing device. The one or more processors may also receive charging data related to a state of an energy storage of the computing device or a state of energy transfer between a wireless charger and the computing device. Based on the motion data and the charging data, a reference vector associated with at least two charging rates may be determined. An alignment vector between the computing device and the wireless charger may then be determined based on the reference vector and the associated charging rates. Based on the alignment vector, an output may be generated guiding movement of the computing device to align with the wireless charger.

19 Claims, 9 Drawing Sheets

(56) References Cited

U.S. PATENT DOCUMENTS

| | | | |
|---|---|---|---|
| 9,564,773 B2 | 2/2017 | Pogorelik et al. | |
| 9,577,449 B2 | 2/2017 | Hoover | |
| 9,876,889 B1* | 1/2018 | Monnin | H04W 4/029 |
| 9,979,221 B2 | 5/2018 | Chin et al. | |
| 10,343,537 B2* | 7/2019 | Widmer | H02J 50/12 |
| 10,447,347 B2* | 10/2019 | Raj | H02J 50/80 |
| 2010/0201315 A1* | 8/2010 | Oshimi | H02J 50/10 320/108 |
| 2012/0313577 A1* | 12/2012 | Moes | H02J 50/40 320/108 |
| 2013/0278212 A1* | 10/2013 | Kai | B60L 53/36 320/108 |
| 2013/0285462 A1* | 10/2013 | Kim | H02J 50/12 307/104 |
| 2014/0002013 A1* | 1/2014 | Kossi | H02J 50/90 320/108 |
| 2014/0094116 A1* | 4/2014 | Walley | H02J 7/00036 455/41.1 |
| 2015/0022194 A1* | 1/2015 | Almalki | H02J 50/402 324/244 |
| 2015/0084583 A1* | 3/2015 | Jung | H02J 50/80 320/108 |
| 2015/0180286 A1* | 6/2015 | Asanuma | H02J 50/90 307/104 |
| 2015/0303701 A1* | 10/2015 | Terao | B60L 53/122 307/104 |
| 2015/0303732 A1* | 10/2015 | Dow | H02J 50/00 320/108 |
| 2015/0357862 A1* | 12/2015 | Saari | H04M 1/72409 340/10.5 |
| 2016/0087691 A1* | 3/2016 | Van Wageningen | H02J 7/025 307/104 |
| 2016/0141908 A1* | 5/2016 | Jakl | H02J 50/10 320/108 |
| 2016/0218545 A1* | 7/2016 | Schroeder | H02J 50/10 |
| 2017/0136907 A1* | 5/2017 | Ricci | B60M 7/003 |
| 2018/0020089 A1* | 1/2018 | Monnin | H01Q 1/24 |
| 2018/0138752 A1* | 5/2018 | Wilson | H02J 50/80 |
| 2018/0272139 A1* | 9/2018 | Stouffer | A61N 1/37235 |
| 2018/0323660 A1* | 11/2018 | Lee | H02J 50/12 |
| 2019/0039470 A1* | 2/2019 | Moghe | B60L 53/39 |
| 2019/0097471 A1* | 3/2019 | Pantic | B60L 53/12 |
| 2019/0123598 A1* | 4/2019 | Patmore | H02J 50/10 |
| 2019/0190291 A1* | 6/2019 | Waters | B64C 11/006 |
| 2019/0356177 A1* | 11/2019 | Swan | H02J 50/10 |
| 2019/0381891 A1* | 12/2019 | Moghe | G06N 20/00 |
| 2020/0171969 A1* | 6/2020 | Moghe | B60L 53/305 |
| 2020/0180459 A1* | 6/2020 | Nagata | B60L 53/38 |

OTHER PUBLICATIONS

Hwang, K. et al. "Autonomous Coil Alignment System Using Fuzzy Steering Control for Electric Vehicles with Dynamic Wireless Charging." Sep. 4, 2015. Mathematical Problems in Engineering, vol. 2015, Article ID 205285. Hindawi Publishing Corporation. 15 pages.

Team Ventev. "Wireless charger not working? Try this." Ventev. Mar. 21, 2018. Retrieved from the Internet: <https://mobileaccessories.ventev.com/learn/wireless-charger-not-working-try-this/>.

International Search Report and Written Opinion for Application No. PCT/US2019/057188 dated Dec. 11, 2019.

* cited by examiner

WIRELESS CHARGING ALIGNMENT

BACKGROUND

A wireless charger may provide charges to a wirelessly charged device without requiring a conductive connection, such as a contact or a wire, between the wireless charger and the wirelessly charged device. In order to do so, the wireless charger may be provided with a transmitter coil for inductively transmitting energy, and the wirelessly charged device may be provided with a receiver coil for inductively receiving the transmitted energy.

While charging rate or efficiency may depend heavily on the alignment between the transmitter coil and the receiver coil, aligning the two coils may not be easy. For instance, the location of the transmitter coil inside the wireless charger and/or the location of the receiver coil inside the wirelessly charged device may not be visible to the user. As such, some wireless chargers are designed for specific types of wirelessly charged devices with holders or other physical features to ensure proper alignment. However, such specifically designed wireless chargers may only be used to charge the devices that they are specifically designed for. Alternatively, wireless chargers and/or wirelessly charged devices may be designed with multiple coils or complex coil geometry to ensure a certain amount of energy transfer even with poor alignment. However, such designs may be challenging with limited space.

BRIEF SUMMARY

The present disclosure provides for a method, comprising: receiving, by one or more processors, motion data from one or more sensors of a computing device, the motion data indicating a motion of the computing device; receiving, by the one or more processors, charging data related to a state of an energy storage of the computing device or a state of energy transfer between a wireless charger and the computing device; determining, by the one or more processors based on the motion data and the charging data, a reference vector associated with at least two charging rates, each charging rate corresponding to an amount of energy transferred per unit of time between the wireless charger and the computing device; determining, by the one or more processors based on the reference vector and the associated charging rates, an alignment vector between the computing device and the wireless charger; and generating, by the one or more processors based on the alignment vector, an output guiding movement of the computing device to align with the wireless charger.

The motion data may include acceleration measurements for the motion of the computing device. The method may further comprise determining, by the one or more processors, displacements of the computing device relative to a prior position of the computing device based on the acceleration measurements, wherein the reference vector is determined based on the displacements.

The motion data may include rotation measurements for the motion of the computing device. The method may further comprise determining, by the one or more processors, orientation information based on the rotation measurements, wherein the alignment vector is determined based on the orientation information.

The alignment vector may be a vector connecting a position of a charging system of the computing device to a position of a charging system of the wireless charger. The alignment vector may be a vector connecting a center of a receiver coil of the computing device to a center of a transmitter coil of the wireless charger.

The method may further comprise: receiving, by the one or more processors, past motion data capturing a motion of the computing device being placed onto a surface; training, by the one or more processors based on the past motion data, one or more models for predicting movement vectors for the computing device when being placed onto a surface. The method may further comprise predicting, by the one or more processors using the one or more models, a movement vector for the computing device as the computing device is being placed by onto the wireless charger, wherein the alignment vector is determined further based on the predicted movement vector.

The output may include a graphical representation of relative positions of the computing device and the wireless charger, and the alignment vector. The output may include a haptic output in a direction of the alignment vector. The output may include an audio instruction.

The method may further comprise: receiving, by the one or more processors, image data from the one or more sensors; recognizing, by the one or more processors based on the image data, the wireless charger; determining, by the one or more processors based on the image data, a relative position of the wireless charger to the computing device, wherein the alignment vector is determined further based on the relative position of the wireless charger to the computing device.

The method may further comprise: receiving, by the one or more processors, signal strength measurements for a wireless connection between the wireless charger and the computing device; determining, by the one or more processors based on the signal strength measurements, a relative position of the wireless charger to the computing device, wherein the alignment vector is determined further based on the relative position of the wireless charger to the computing device.

The method may further comprise determining, by the one or more processors, that the wireless charger includes a plurality of charging systems; identifying, by the one or more processors, one of the plurality of charging systems being closest to the computing device, wherein the alignment vector is determined for the identified charging system closest to the computing device.

The disclosure further provides for a system, comprising one or more processors configured to: receive motion data from one or more sensors of a computing device, the motion data indicating a motion of the computing device; receive charging data related to a state of an energy storage of the computing device or a state of energy transfer between a wireless charger and the computing device; determine, based on the motion data and the charging data, a reference vector associated with at least two charging rates, each charging rate corresponding to an amount of energy transferred per unit of time between the wireless charger and the computing device; determine, based on the reference vector and the associated charging rates, an alignment vector between the computing device and the wireless charger; and generate, based on the alignment vector, an output guiding movement of the computing device to align with the wireless charger.

The system may further comprise the one or more sensors, wherein the one or more sensors include at least one of: an accelerometer, a gyroscope, and an optical sensor.

The system may further comprise a communication module configured to measure a signal strength for a connection between the computing device and the wireless charger;

wherein the one or more processors are further configured to receive signal strength measurements for a connection between the computing device and the wireless charger, and determine a relative position of the wireless charger to the computing device, wherein the alignment vector is determined further based on the relative position of the wireless charger to the computing device.

The system may further comprise one or more output devices, wherein the one or more output devices include at least one of: a display, a haptic interface, and a speaker.

The one or more processors of the system may be further configured to: receive past motion data capturing a motion of the computing device being placed onto a surface; train, based on the past motion data, one or more models for predicting movement vectors for the computing device when being placed onto a surface.

DETAILED DESCRIPTION

Overview

Figure 1:
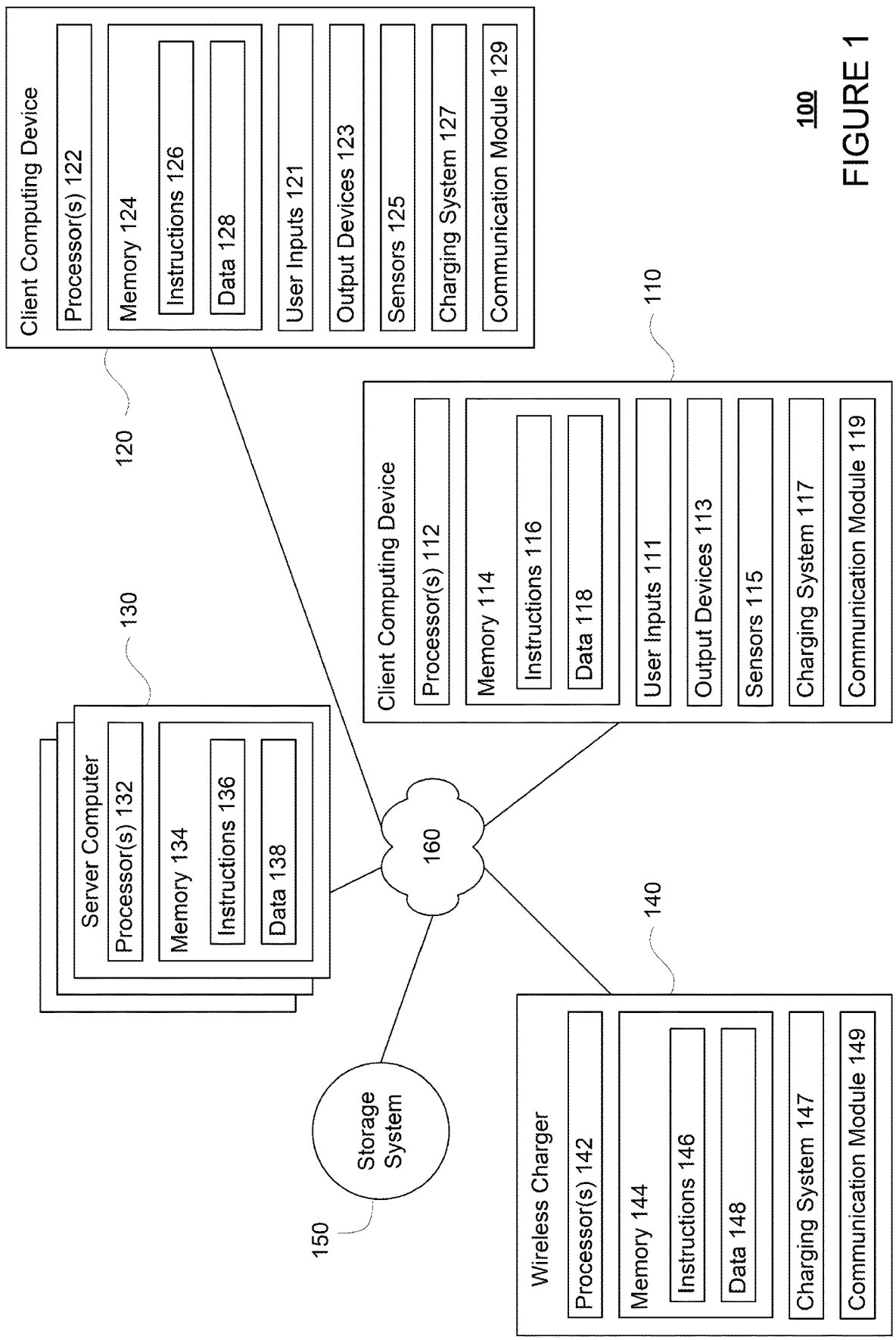
FIG. 1 is a block diagram of an example system in accordance with aspects of the disclosure.

The technology generally relates to wireless charging alignment. As mentioned above, charging rate or efficiency between a wireless charger and a wirelessly charged device may depend heavily on alignment between a transmitter coil and a receiver coil. However, a user may have difficulties aligning the two coils, since the location of the transmitter coil inside the wireless charger and/or the location of the receiver coil inside the wirelessly charged device may not be visible to the user. Further, the user may want to use different wireless chargers on different occasions based on availability. As such, attempting to align the wirelessly charged device to an unfamiliar wireless charger may be even more difficult. To address these issues, the present disclosure provides a system configured to use motion data and charging data for determining wireless charging alignment between a computing device and a wireless charger, and to provide alignment instructions to the user in real-time.

In this regard, one or more processors may receive motion data from one or more sensors of a computing device, the motion data indicating a motion of the computing device. For instance, the motion data may include inertial measurements measured by an inertial measurement unit (IMU) of the computing device. For example, the inertial measurements may include acceleration measurements from an accelerometer of the computing device. The acceleration measurements may include directional information, such as three-dimensional vectors, indicating a direction of movement of the computing device. For another example, the inertial measurements may include rotation or orientation measurements from a gyroscope of the computing device.

The processors may also receive charging data of the computing device. For instance, charging data may be related to a state of an energy storage of the computing device or a state of energy transfer between a wireless charger and the computing device. For example, charging data may include charging rate measurements, such as an amount of energy transfer per unit of time between the wireless charger and the computing device. In some instances, the processors may determine charging rate based on charging data, such as based on the amounts of charge in the battery at different time points.

Based on the motion data and the charging data received, the processors may determine a reference vector associated with at least two charging rates. For example, each charging rate may correspond to an amount of energy transferred per unit of time between the wireless charger and the computing device. For instance, displacement vectors may be determined based on the acceleration measurements, such as by taking a double integral of the acceleration vectors. The displacement vectors and the charging data may be matched based on their respective timestamps. As such, a displacement vector, or a combination of displacement vectors, may be chosen as a reference vector such that the reference vector is associated with at least two charging rates. For example, a beginning of the reference vector may be associated with a first charging rate, and an end of the reference vector may be associated with a second charging rate.

Based on the reference vector and the associated charging rates, the processors may determine an alignment vector between the computing device and the wireless charger. For instance, for a wireless charger configured according to a standard, charging rates may be known at predetermined distances from a center of a transmitter coil of the wireless charger. As such, the charging rates using the wireless charger may be represented by a pattern, such as a series of consecutive rings or spheres with a center at the center of the transmitter coil. The processors may determine a location of the reference vector in this pattern, and then determine an alignment vector that connects the end of the reference vector to the center of the transmitter coil.

Once the alignment vector is determined, the one or more processors may generate an output guiding movement of the computing device to align with the wireless charger. For instance, the output may be a display of a graphical representation showing relative positions of the transmitter coil of the wireless charger and the receiver coil of the computing device, and the alignment vector. In addition or as alternatives, the output may include a display of other graphics or texts, audio outputs, haptic outputs, etc.

Instead of determining an alignment vector, the processors may determine whether a recent movement of the computing device causes an increase or a decrease in charging rate, and generate an output guiding movement of the computing device based on that determination. For example, the processors may generate an output instructing the user to continue moving in the same direction if charging rate increased during the recent movement. For another example, the processors may generate an output instructing the user to move in an opposite direction if charging rate decreased during the recent movement.

Additionally or alternatively, the processors may also receive and use other types of data in determining charging alignment. For example, processors may receive image data from a camera, and may recognize a wireless charger in a surrounding of the computing device. The processors may determine a relative position of the wireless charger to the computing device, and generate output guiding movement of the computing device based on the relative position. For another example, processors may receive signal strength measurements for a wireless connection between the computing device and the wireless charger. The processors may determine a distance between the wireless charger and the computing device based on the signal strength measurements, and generate output guiding movement of the computing device based on the distance.

In another aspect, one or more models may be trained to predict a motion of the computing device when being set down on a wireless charger. For instance, past motion data capturing the motion of the computing device while it is being placed onto a surface may be received by the processors. The processors may use the past motion data to train a model to recognize patterns in the motion of the computing device. Once trained, the model may be used to predict a motion of the computing device when being placed onto a wireless charger, such as a vector of the predicted motion. As such, the processors may further use the predicted vector for determining charging alignment and generating instructions.

The technology is advantageous because it allows a system to assist a user to accurately align a computing device with a wireless charger. With better alignment, greater charging rate may be achieved, making the charging process more energy efficient. The system may determine charging alignment for the computing device to wireless chargers of any of a number of shapes or sizes. Further, the system may determine charging alignment even when the wireless charging capability is provided by an accessory of the computing device, such as a cover or holder. The technology further provides for training models to predict motions of the computing device as the computing device is placed onto a wireless charger, which may further increase the speed and accuracy of the alignment process.

Example Systems

Figure 2:
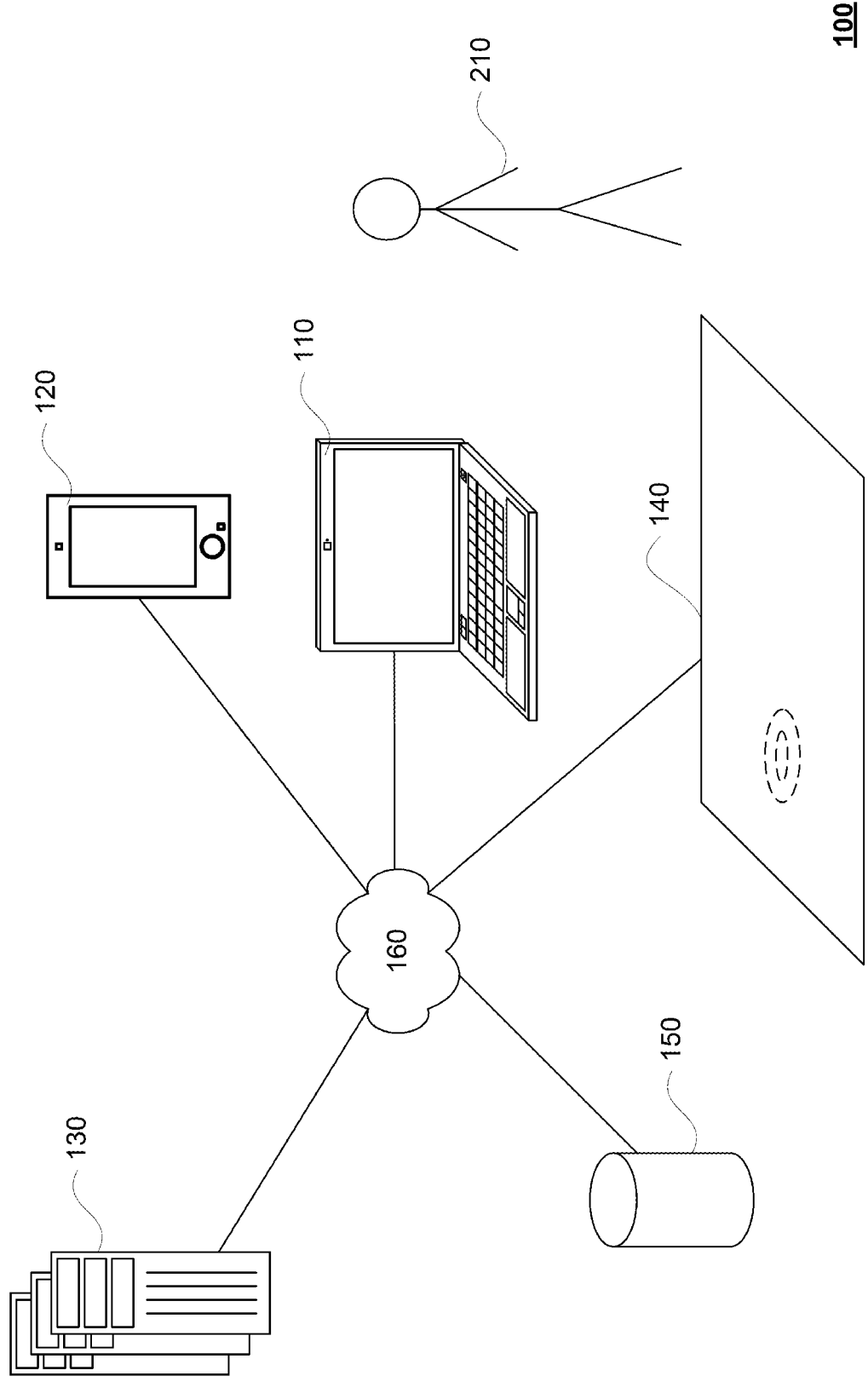
FIG. 2 is a pictorial diagram illustrating the example system in accordance with aspects of the disclosure.

FIGS. 1 and 2 illustrate an example system 100 in which the features described herein may be implemented. It should not be considered as limiting the scope of the disclosure or usefulness of the features described herein. In this example, system 100 can include computing devices 110, 120, and 130, wireless charger 140, as well as storage system 150. For example as shown, computing device 110 contains one or more processors 112, memory 114 and other components typically present in general purpose computing devices.

Memory 114 can store information accessible by the one or more processors 112, including instructions 116 that can be executed by the one or more processors 112. Memory 114 can also include data 118 that can be retrieved, manipulated or stored by the processors 112. The memory 114 can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, computing device 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing device 110. Accordingly, references to a processor, computer, computing device, or memory will be understood to include references to a collection of processors, computers, computing devices, or memories that may or may not operate in parallel. For example, the computing device 110 may include computing devices operating in a distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110, 120, 130 can be at different nodes of a network 160 and capable of directly and indirectly communicating with other nodes of network 160. Although only a few computing devices are depicted in FIGS. 1 and 2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Each of the computing devices 120 and 130 may be configured similarly to the computing device 110, with one or more processors, memory and instructions as described above. For instance as shown in FIGS. 1 and 2, computing devices 110 and 120 may each be a client computing device intended for use by a user 210, and have all of the components normally used in connection with a personal computing device such as a central processing unit (CPU), memory (e.g., RAM and internal hard drives) storing data and instructions, input and/or output devices, sensors, communication module, clock, etc. For another instance as shown in FIGS. 1 and 2, computing device 130 may be a server computer and may have all of the components normally used in connection with a server computer, such as processors, and memory storing data and instructions.

Although the computing devices 110 and 120 may each comprise a full-sized personal computing device, they may alternatively comprise mobile computing devices capable of wirelessly exchanging data with a server over a network such as the Internet. For example, computing device 110 may be a laptop computer as shown in FIG. 2, or a tablet PC or a netbook that is capable of obtaining information via the Internet. For another example, computing device 120 may be a mobile phone as shown in FIG. 2 or some other mobile device such as a wireless-enabled PDA. In other instances, one or more of the computing devices 110 and 120 may be a wearable computing device, for example such as a smartwatch or a head-mountable device.

Computing devices 110 and 120 may include one or more user inputs, such as user inputs 111 and 121 respectively. For instance, user inputs may include mechanical actuators, soft actuators, periphery devices, sensors, and/or other components. For example, mechanical actuators may include buttons, switches, etc. Soft actuators may include touchpads and/or touchscreens. Periphery devices may include keyboards, mouse, etc. Sensors for user inputs may include microphones for detecting voice commands, visual or optical sensors for detecting gestures, etc.

Computing devices 110 and 120 may include one or more output devices, such as output devices 113 and 123 respectively. For instance, output devices may include a user display, such as a screen or a touch screen, for displaying information or graphics to the user. Output devices may include one or more speakers, transducers or other audio outputs. Output devices may include a haptic interface or other tactile feedback that provides non-visual and non-audible information to the user.

Computing devices 110 and 120 may include one or more sensors, such as sensors 115 and 125 respectively. For instance, sensors may include a visual sensor, such as a camera, or other types of optical sensors, such as infrared sensors. Sensors may include an audio sensor, such as a microphone. Sensors may also include motion sensors, such as an IMU. According to some examples, the IMU may include an accelerometer, such as a 3-axis accelerometer, and a gyroscope, such as a 3-axis gyroscope. The sensors may further include a barometer, a vibration sensor, a heat sensor, a radio frequency (RF) sensor, a magnetometer, and a barometric pressure sensor. Additional or different sensors may also be employed.

In order to be powered, computing devices 110 and 120 may include one or more charging systems, such as charging systems 117 and 127 respectively. The charging systems 117 and/or 127 may be configured to receive charges without requiring a conductive connection, such as a wired connection. In this regard, the charging systems 117 and/or 127 may be configured to be wirelessly charged in any of a number of ways, such as by inductive charging. For example, the charging systems 117 and/or 127 may each include one or more receiver coils for receiving electromagnetic energy inductively from one or more transmitter coils. In some instances, the charging systems 117 and/or 127 may be configured for wireless charging according to a standard, such as the Qi standard, the Power Matters Alliance (PMA) standard, etc. In other instances, the charging systems 117 and/or 127 may additionally or alternatively be configured for wireless charging according to non-standard protocols, such as a proprietary protocol.

Additionally or alternatively, the charging systems 117 and/or 127 may be configured to be charged using conductive connection, such as a conductive contact or a wired connection. In instances where charging systems 117 and/or 127 are not configured for wireless charging, an accessory may be used to enable wireless charging. For example, a cover or a holder may include one or more receiver coils for receiving electromagnetic energy inductively from a wireless charger, and may also include one or more conductive elements, such as a contact, a wire, or a dongle, for connecting to the charging system 117 of computing device 110, or charging system 127 of computing device 120.

The charging systems 117 and/or 127 may be configured to collect charging data for the computing device 110 and/or 120. For instance, the charging systems 117 and/or 127 may include one or more energy storages, such as batteries, and the charging data collected may include a status, such as an amount of charges in the energy storages. For another instance, while being charged, charging systems 117 and/or 127 may measure an amount of energy received per unit of time (e.g., in W or J/s), or charging rate. Alternatively or additionally, charging systems 117 and/or 127 may receive charging data from the wireless charger 140.

In order to obtain information from and send information to remote devices, such as server computing device 130, wireless charger 140, and to each other, computing devices 110 and 120 may each include a communication module, such as communication modules 119 and 129 respectively. The communication modules may enable wireless network connections, wireless ad hoc connections, and/or wired connections. Via the communication module, the computing devices may establish communication links, such as wireless links. For instance, the communication modules 119 and/or 129 may include one or more antennas, transceivers, and other components for operating at radiofrequencies. The communication modules 119 and/or 129 may be configured to support communication via cellular, LTE, 4G, WiFi, GPS, and other networked architectures. The communication modules 119 and/or 129 may be configured to support Bluetooth®, Bluetooth LE, near field communications, and non-networked wireless arrangements. The communication modules 119 and/or 129 may support wired connections such as a USB, micro USB, USB type C or other connector, for example to receive data and/or power from a laptop, tablet, smartphone or other device.

Using their respective communication modules, one or more of the computing devices 110 and/or 120 may be paired with the wireless charger 140 for transmitting and/or receiving data from one another. For example, computing devices 110 and/or 120 may come within a predetermined distance of wireless charger 140, and may discover wireless charger 140 via Bluetooth® in the vicinity. As such, computing device 110 and/or 120, or wireless charger 140, may initiate pairing. Before pairing, user authentication may be requested by the computing device 110 and/or 120, or wireless charger 140. In some instances, an authentication process may be required for pairing. For example, two-way authentication may be required for pairing, where the user must authenticate the pairing on both devices to be paired, such as on both computing device 110 and wireless charger 140.

The communication modules 119 and 129 may be configured to measure signal strengths for wireless connections. For example, communication modules 119 and 129 may be configured to measure received signal strength (RSS) of a Bluetooth® connection. In some instances, communication modules 119 and 129 may be configured to receive the measured RSS from another device, such as from the wireless charger 140.

The computing devices 110 and 120 may each include one or more internal clocks. The internal clocks may provide timing information, which can be used for time measurement for apps and other programs run by the computing devices, and basic operations by the computing devices, sensors, inputs/outputs, GPS, communication system, etc.

Further as shown in FIGS. 1 and 2, wireless charger 140 may be configured to charge one or more devices without requiring a wired connection. In this regard, wireless charger 140 may include one or more charging systems, such as charging system 147. The charging system 147 may be configured to provide wireless charging in any of a number of ways, such as by inductive charging. For example, charging system 147 may include one or more transmitter coils for transmitting electromagnetic energy to one or more receiver coils. In some instances, the charging system 147 may be configured for wireless charging according to a standard, such as the Qi standard, the Power Matters Alliance (PMA) standard, etc. In other instances, the charging system 147 may additionally or alternatively be configured for wireless charging according to non-standard protocols, such as a proprietary protocol. In some instances, the charging system 147 may be configured to collect charging data for a device being charged by the wireless charger 140, such as computing device 110 or 120, and may send the charging data to another device, such as the device being charged.

As shown in the example of FIG. 2, the wireless charger 140 may be configured with a surface onto which wirelessly charged devices, such as computing device 110 or 120, may be placed for wireless charging. For example, the wireless charger 140 may have a flat top surface similar to a top surface of a table. In this regard, transmitter coils in the wireless charger 140 may be configured to be in planes parallel to the top surface. The wireless charger 140 may be configured to accommodate wirelessly charged devices of any of a number of shapes and sizes. The wireless charger 140 may alternatively or additionally be configured with other features, such as having an inclined surface onto which wirelessly charged devices may be placed, holders or adjustable holders for holding wirelessly charged devices, recesses in which wirelessly charged devices may be placed, etc.

The wireless charger 140 may be configured similarly as computing devices 110, 120, or 130, with some or all of the components normally used in connection with a computing device, such as one or more processors, memory (e.g., RAM and internal hard drives) storing data and instructions, input and/or output devices, sensors, communication module, charging system, clock, etc. In other instances, the wireless charger 140 may include the one or more charging systems 147 without any of the components normally used in connection with a computing device.

As with memory 114, storage system 150 can be of any type of computerized storage capable of storing information accessible by one or more of the computing devices 110, 120, 130, and/or wireless charger 140, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and/or wireless charger 140 (not shown).

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

For instance, the user 210 may decide to charge the computing device 110 wirelessly using wireless charger 140. As such, the user 210 may set down the computing device 110 on a surface of the wireless charger 140, such as a top surface of the wireless charger 140. The user 210 may need to position the computing device 110 on the wireless charger 140 such that energy can be inductively transferred from the charging system 147 of the wireless charger to the charging system 117 of the computing device 110.

Figure 3:
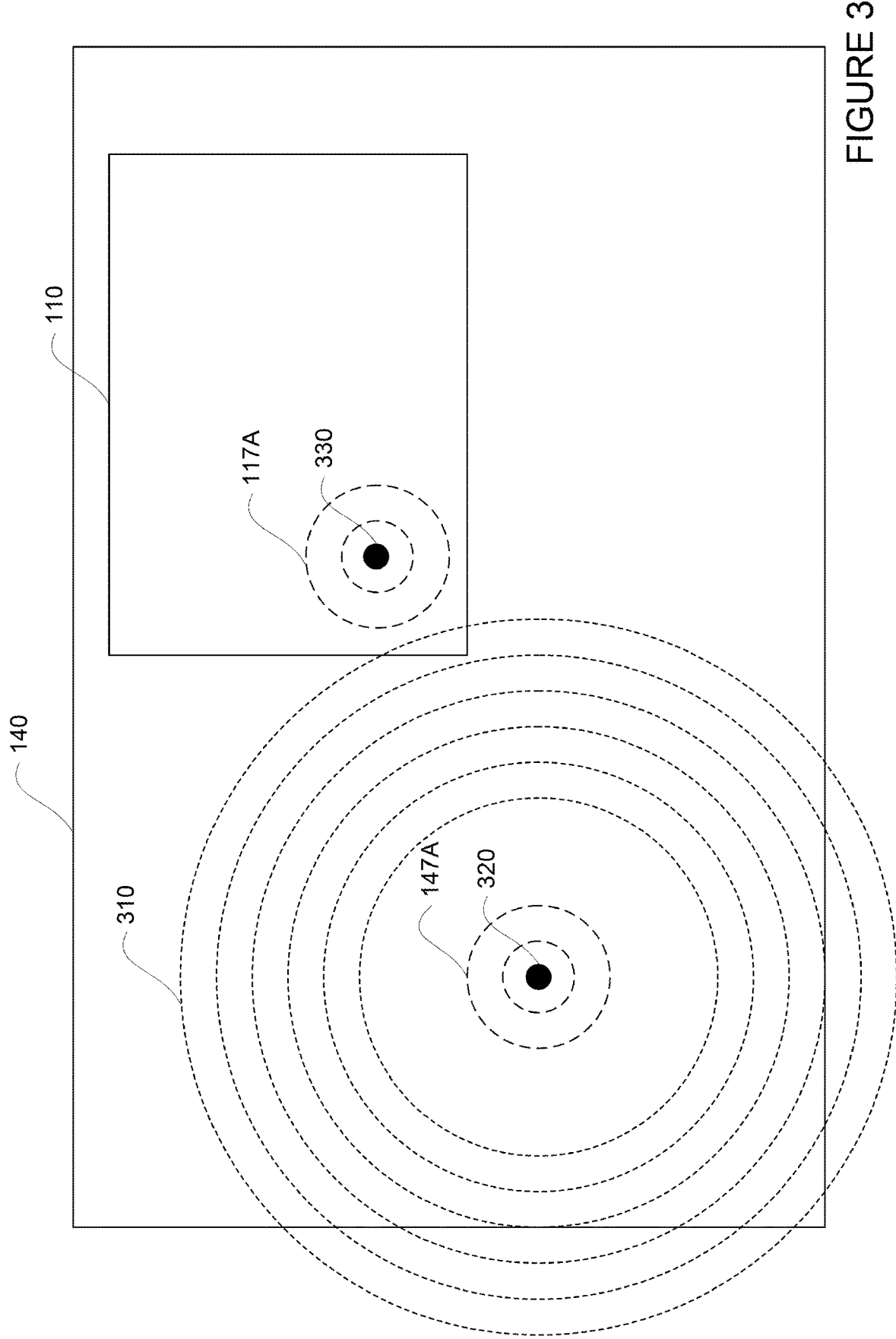
FIG. 3 illustrates an example computing device and an example wireless charger in accordance with aspects of the disclosure.

FIG. 3 illustrates an example of a computing device and a wireless charger in accordance with aspects of the disclosure. Referring to the example in FIG. 3, wireless charger 140 includes a transmitter coil 147A configured to emit electromagnetic energy, for example the transmitter coil 147A may be part of the charging system 147 of the wireless charger 140. Further as shown in FIG. 3, computing device 110 includes a receiver coil 117A configured to receive electromagnetic energy, for example the receiver coil 117A may be part of the charging system 117 of the computing device 110. As such, when computing device 110 is in a vicinity of the wireless charger 140, such as within a predetermined distance, the transmitter coil 147A may engage the receiver coil 117A electromagnetically such that energy may be transferred inductively from the transmitter coil 147A to the receiver coil 117A.

The electromagnetic energy may be transferred at different rates depending on a distance between the transmitter coil 147A and the receiver coil 117A. For example, the electromagnetic energy may be transferred at higher rates when the receiver coil 117A is placed near the transmitter coil 147A than when the receiver coil 117A is placed far from the transmitter coil 147A. As such, charging rate using the wireless charger 140 may be represented by a pattern 310. The pattern 310 may, for example, represent contours of the charging rate. For example, the charging rate may be the highest when a center 320 of the transmitter coil 147A is exactly aligned with a center 330 of the receiver coil 117A, and decreases as the center 330 of the receiver coil 117A moves away from the center 320 of the transmitter coil 147A. As shown, the pattern 310 includes a series of concentric rings, where each concentric ring may be at a predetermined distance from the center 320 of the transmitter coil 147A. In instances where the wireless charger 140 is configured according to a standard, such as the Qi standard, the charging rate at a position on each ring may be predetermined.

Although the pattern 310 is shown as two-dimensional for ease of illustration, the pattern 310 may alternatively be three-dimensional, for example including a series of concentric spheres. It will be appreciated that the pattern 310 may have a shape that depends on the geometry of the transmitter coil 147A and/or receiver coil 147B, and may not necessarily be series of concentric rings/spheres. Depending on the geometry of the transmitter coil 147A and/or receiver coil 147B, the charging rate may be the highest at a point that does not correspond to the geometric centers of the transmitter coil 147A and receiver coil 147B being aligned. Further, in instances where the charger 140 is not configured according to a standard, the charging rate pattern of the charger 140 may be estimated based on monitoring movements of computing device 110 and charging rate resulting from the movements.

In order to increase the charging rate, the user 210 may align the receiver coil 117A to the transmitter coil 147A. In some instances, a position of the transmitter coil 147A may be marked on the surface of the wireless charger 140 in order to facilitate alignment. For example, the center 320 of the transmitter coil 147A may be marked on the top surface of the wireless charger 140. As such, the user 210 may try to position the computing device 110 as close to the marked center 320 of the transmitter coil 147A as possible. However, a position of the receiver coil 117A may not similarly be marked on the computing device 110. As such, the user 210 may not be able to align the two coils effectively. For example, the user 210 may attempt to align a center of the computing device 110 to the marked center 320 of the transmitter coil 147A, but as shown, the center 330 of the receiver coil 117A is not located at the center of the computing device 110. Further, even if the position of the receiver coil 117A is also marked on a surface of the computing device 110, it may not be easy for the user 210 to align the two markings, since computing device 110 may block a view of the marking on the surface of the wireless charger 140 while being placed down onto the wireless charger 140.

In addition, aligning a computing device with a large form factor, such as a laptop computer or a tablet, may be particularly difficult. For instance, where the position of the receiver coil 117A is unmarked, the receiver coil 117A may be located anywhere within a relative large space inside the computing device 110 (for example tens of centimeters). In contrast, for a computing device with a smaller form factor, such as a mobile phone, the position of the receiver coil would be constrained within a smaller space (for example a few centimeters). For another instance, a larger computing device may block more of the user's view as the user places the computing device onto the wireless charger. As such, computing device 110 may be configured to assist the user 210 in the charging alignment process.

Figure 4:
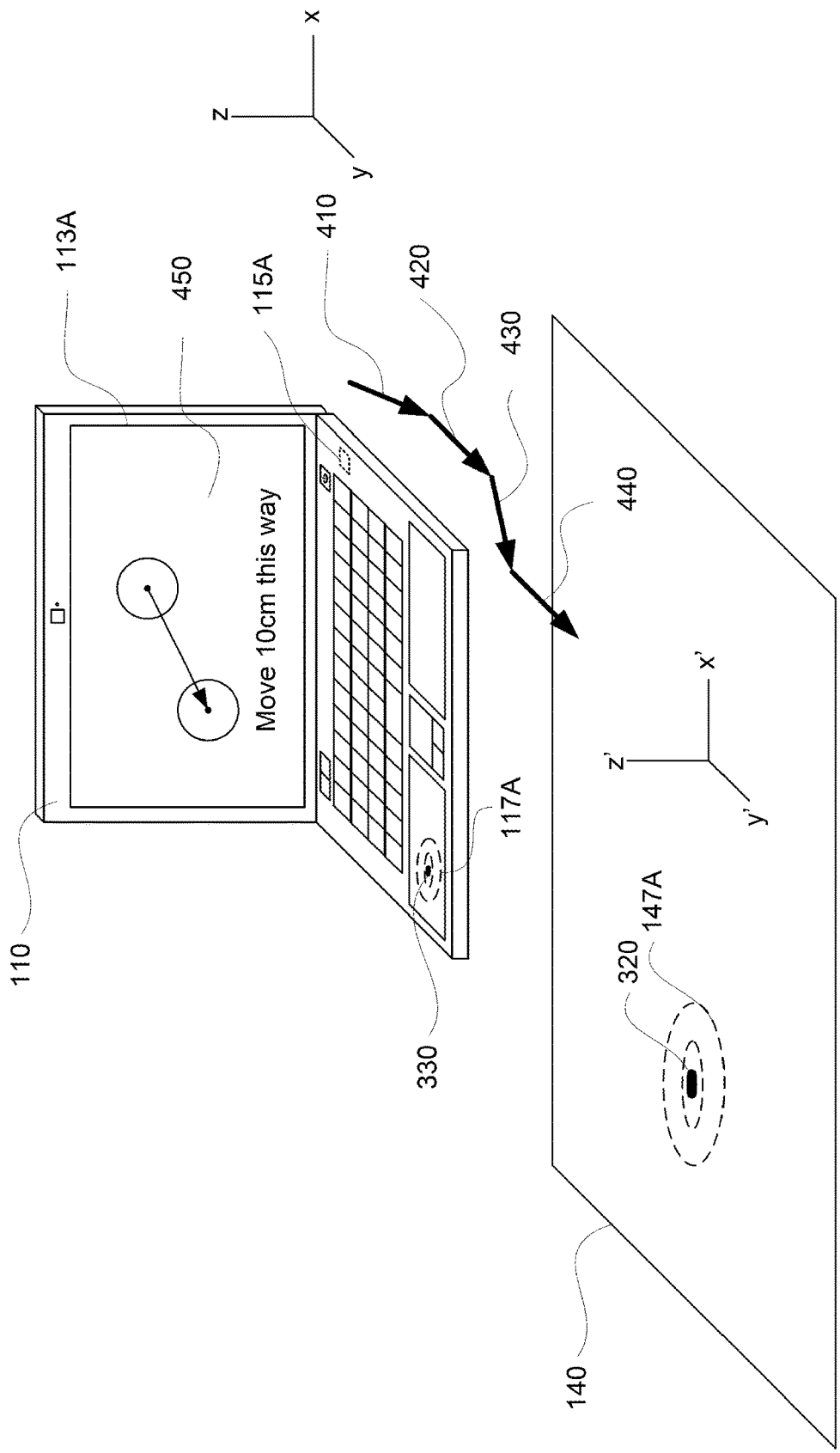
FIG. 4 illustrates an example of aligning a computing device to a wireless charger using motion data in accordance with aspects of the disclosure.

FIG. 4 shows an example of aligning a computing device to a wireless charger using motion data in accordance with aspects of the disclosure. Motion data includes information associated with the motion of a computing device (including parts thereof) through space. For example, motion data for a motion may include one or more vectors associated with the motion's angle and speed, which may include a series of 3D coordinates associated with the position of a computing device, or a portion of the computing device, at different times. In this regard, motion data for computing device 110 may be collected by one or more sensors of the computing device 110, such as one or more sensors in an IMU. Referring to FIG. 4, the one or more sensors may include an accelerometer 115A of the computing device 110, such as a three-axis accelerometer that can measure accelerations in a three-dimensional space.

In the instance where the user consents to the use of such data, sensor data from the computing device 110 may be used to determine charging alignment between computing device 110 and the wireless charger 140. For instance, computing device 110 may come within a predetermined distance from wireless charger 140, and detect electromagnetic energy emitted from the wireless charger 140. As such, computing device 110 may determine that user 210 will attempt to use the wireless charger 140 for charging computing device 110, and may assist the user 210 in charging alignment. For example, computing device 110 may display a prompt asking the user 210 whether sensor data may be used for charging alignment. In some instances, computing device 110 may allow the user 210 to select the types of data that the user grants permission for use in charging alignment by computing device 110. Alternatively or additionally, the user 210 may have configured authorization settings in the computing device 110 beforehand to permit using sensor data for charging alignment.

Processors 112 may thereafter receive sensor data from its sensors. The received sensor data may include motion data detected by one or more sensors of the computing device 110, such as inertial measurements. In the example shown in FIG. 4, the sensor data includes inertial measurements from accelerometer 115A. For instance, accelerometer 115A may measure accelerations of the computing device 110 with respect to three axes in a three-dimensional space. For example and as shown in FIG. 4, two axes x and y may correspond to two directions in a plane of a surface of the computing device 110 (e.g., bottom surface of a housing of the laptop), and one axis z may correspond to a direction normal to the surface of the computing device 110. In other examples, the axes x, y, and z may be some other axes sufficient to define a three-dimensional space.

Processors 112 may receive a time-based series of acceleration measurements from the accelerometer 115A, such as $[t1; a\_x1, a\_y1, a\_z1], [t2; a\_x2, a\_y2, a\_z2], \ldots, [tn; a\_xn, a\_yn, a\_zn]$. For instance, each acceleration measurement may be associated with a timestamp provided by an internal clock of the computing device 110. For example, at time t1, a_x1 may be the value for acceleration along the x-axis in the plane of the bottom surface of the housing of the laptop, a_y1 may be the value for acceleration along the y-axis also in the plane of the bottom surface of the housing of the laptop, and a_z1 may be the value for acceleration along the z-axis normal to the bottom surface of the housing of the laptop. As such, the acceleration measurements in the time-based series may be vectors.

Based on the received acceleration measurements from the accelerometer 115A, processors 112 may generate additional motion data. As an example, a time-based series of velocities may be generated based on the time-based series of acceleration measurements, for instance by taking an integral of the time-based series of acceleration measurements with respect to time. For another example, processors 112 may determine a time-based series of displacements based on the time-based series of acceleration measurements. For instance, processors 112 may take a double integral of the time-based series of acceleration measurements with respect to time. Since the acceleration measurements include direction information, the integrals may be taken with respect to time separately for each direction. As such, a time-based series of displacements may be [t1; x1, y1, z1], [t2; x2, y2, z2], . . . , [tn1; xn, yn, zn]. The displacements in the time-based series, like the acceleration measurements, may also be vectors. FIG. 4 shows example displacement vectors 410, 420, 430, 440, which are connected to represent consecutive movements. Each displacement vector represents a movement from a prior position of the computing device 110 to a new position of the computing device 110.

Processors 112 may also receive charging data of the computing device 110. For example, charging data may include data related to a state of an energy storage or data related to a state of an energy transfer. For instance, charging data may include a state of a battery or other types of energy storage, such as an amount of charge in the battery. For another instance, charging data may include an amount or rate of energy transfer between two devices. As mentioned above with respect to example systems, the charging system 117 may be configured to collect charging data for the computing device 110. For example, charging system 117 may measure an amount of energy received per unit of time or charging rate (e.g., in W or J/s) as charging data. Each measurement of the charging data may be associated with a timestamp, for example the timestamps may be provided by a clock of computing device 110. As such, processors 112 may receive from charging system 117 a time-based series of charging rate measurements, such as [t1'; R1], [t2'; R2] . . . , [tn'; Rn].

In instances where the charging system 117 does not directly measure charging rate as charging data, processors 112 may determine charging rate based on other charging data. For example, charging system 117 may measure a total amount of charge stored in a battery of the charging system 117 (e.g., in J). Each measurement may be provided with a timestamp, such as by a clock of computing device 110. Processors 112 may then determine charging rate by finding a difference between the total amounts of charge stored in the battery at two different timestamps, and divide the difference by the duration between the two timestamps. In other examples, processors 112 may receive charging data from the wireless charger 140.

Based on the motion data and the charging data, processors 112 may determine charging alignment. In this regard, processors 112 may determine a reference vector associated with at least two charging rates. For example, processors 112 may match each charging rate with an inertial measurement having a timestamp closest in time. In instances where charging rate and inertial measurements are measured at a same frequency, each displacement vector in the time-based series may be matched with a charging rate measurement, for example displacement vector 410 [t1; x1, y1, z1] may be matched with [t1'; R1], and displacement vector 420 next in time [t2; x2, y2, z2] may be matched with [t2'; R2], etc. As such, displacement vector 410 [t1; x1, y1, z1] may be determined as a reference vector associated with both charging rates R1 and R2. In other words, during the movement represented by the reference vector [t1; x1, y1, z1], charging rate changed from R1 to R2.

In instances where charging rate is measured at a lower frequency than the inertial measurements, two or more consecutive displacement vectors may be combined into a reference vector so that the reference vector may be associated with at least two charging rates. For example, if the charging rate is measured at half the frequency as the inertial measurements, the displacement vector 410 [t1; x1, y1, z1] may be combined with displacement vector 420 [t2; x2, y2, z2] into a vector [t1; x2-x1, y2-y1, z2-z1] and matched with [t1'; R1], the displacement vector 430 [t3; x3, y3, z3] may be combined with displacement vector 440 [t4; x4, y4, z4] into a vector [t3; x4-x3, y4-y3, z4-z3] and matched with [t2'; R2], etc. As such, the vector [t1; x2-x1, y2-y1, z2-z1] may be determined as a reference vector associated with charging rates R1 and R2.

In instances where charging rate is measured at a higher frequency than the inertial measurements, more than one charging rates may be matched with each displacement vector. For example, if the charging rate is measured at twice the frequency as the inertial measurements, the displacement vector [t1; x1, y1, z1] may be matched with [t1A'; R1A] and [t1B'; R1B], and the displacement vector [t2; x2, y2, z2] may be matched with [t2A'; R2A] and [t2B'; R2B]. As such, displacement vector [t1; x1, y1, z1] may be determined as a reference vector associated with charging rates R1A, R1B, R2A.

Figure 5:
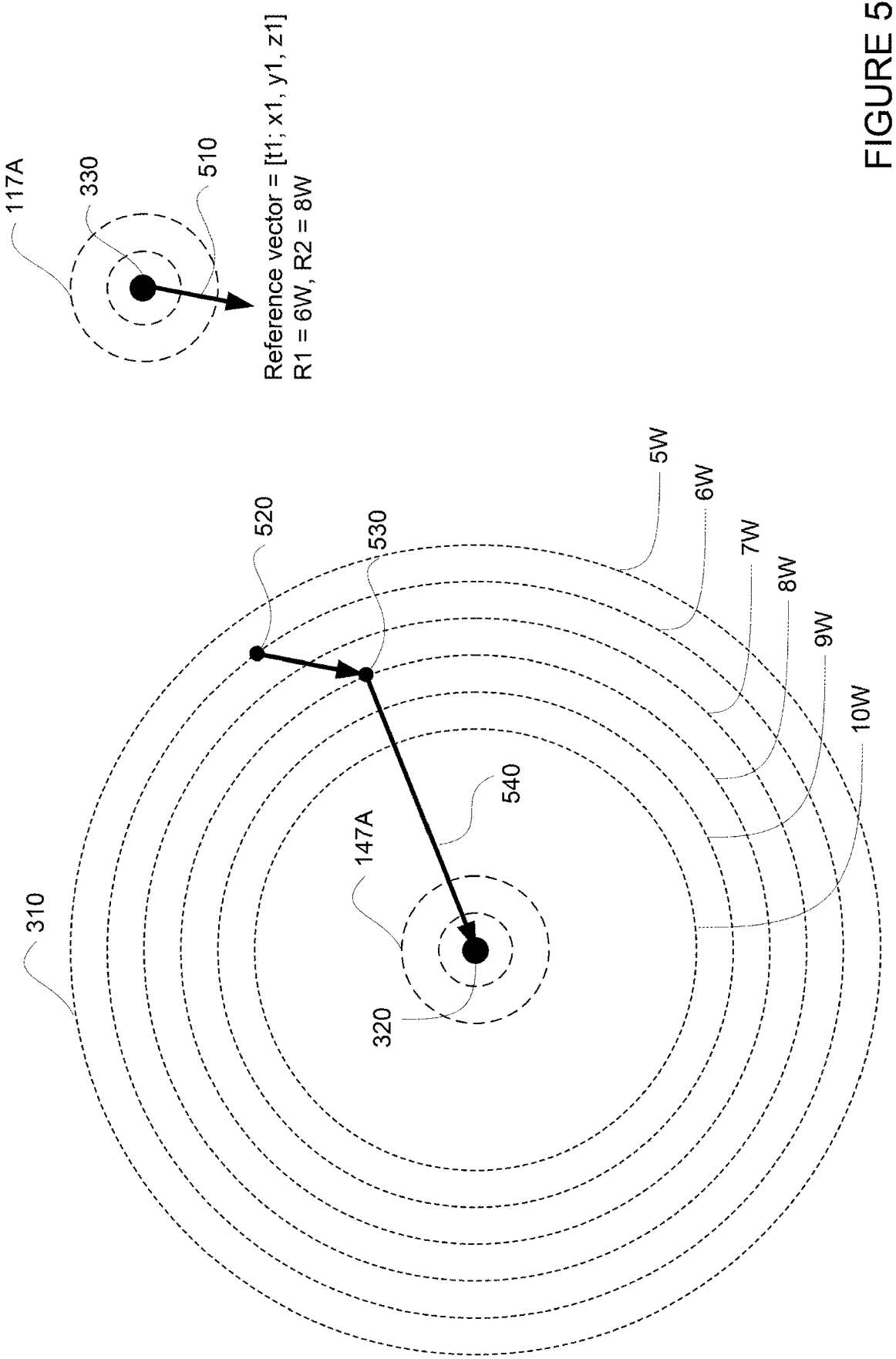
FIG. 5 illustrates an example of determining an alignment vector between the computing device and the wireless charger of FIG. 4 in accordance with aspects of the disclosure.

Based on the reference vector and the associated charging rates, processors 112 may determine an alignment vector between the computing device 110 and the wireless charger 140. FIG. 5 shows an example of determining an alignment vector in accordance with aspects of the disclosure. FIG. 5 shows the transmitter coil 147A of the wireless charger 140, the center 320 of the transmitter coil 147A, and the pattern 310 representing charging rates at a number of predetermined distances from the center 320. FIG. 5 further shows receiver coil 117A of the computing device 110, the center 330 of the receiver coil 117A, and a reference vector 510 associated with two charging rates R1 and R2. For instance, the reference vector 510 and the associated charging rates may be determined as described above.

In this regard, processors 112 may determine a location of the reference vector 510 in the pattern 310. For instance, processors 112 may determine that, during the movement represented by the reference vector 510, charging rate has increased from 6 W to 8 W. As such, processors 112 may determine two rings/contours in the pattern 310 that respectively correspond to 6 W and 8 W charging rates. Processors 112 may then identify a first point 520 on the 6 W ring and a second point 530 on the 8 W ring such that a vector starting at the first point 520 and ending at the second point 530 would be the same as the reference vector 510. In instances where one or more of the associated charging rates does not correspond to a predetermined ring of the pattern 310, the location of the reference vector 510 in the pattern 310 may be interpolated. For example, if R1 is 6.5 W, processors 112 may estimate that the first point 520 is located about halfway between the 6 W ring and the 7 W ring. For another example, if the 6 W ring and the 7 W ring are 1 cm apart, processors 112 may interpolate that the first point 520 is about 5 mm from the 6 W ring and 5 mm from the 7 W ring.

Based on the location of the reference vector 510 in the pattern 310, processors 112 may determine an alignment vector between the center 330 of the receiver coil 117A and the center 320 of the transmitter coil 147A. As shown in FIG. 5, there can only be one vector connecting any point of the pattern 310 to the center 320 of the transmitter coil 147A. As such, since the second point 530 corresponds to the center 330 of the receiver coil 117A at the end of the movement represented by reference vector 510, processors 112 may determine that the vector connecting the second point 530 to the center 320 of the transmitter coil 147A as the alignment vector 540.

In the example described above, determination of the alignment vector assumes that a coordinate system of the computing device 110 have axes (shown as x, y, z) substantially parallel to axes (shown as x', y', z') of a coordinate system of the wireless charger 140. In other words, the example determination above assumes that the computing device 110 is being placed down onto the wireless charger 140 such that the bottom surface of the housing of computing device 110 remains substantially parallel to the top surface of the wireless charger 140. Such assumptions may not always be true. Further, acceleration measurements from an accelerometer may be total acceleration values that do not distinguish between linear and angular acceleration. As such, it may be difficult to determine based on acceleration measurements alone whether computing device 110 is being moved linearly, spun around, or some combination of both. Additionally, although the charger 140 and computing device 110 in this example are both shown having planar surfaces with their respective coils positioned in parallel planes as the surfaces, in other instances the charger 140 and/or computing device 110 may not have planar surfaces, or their respective charging coils may not be parallel to the outer surfaces of the charger 140 and/or computing device 110. In such instances, determining orientation of the computing device 110, and/or distinguishing linear from angular motions of the computing device 110 may be used to determine whether the transmitter coil 147A and receiver coil 117A are in parallel planes.

Figure 6:
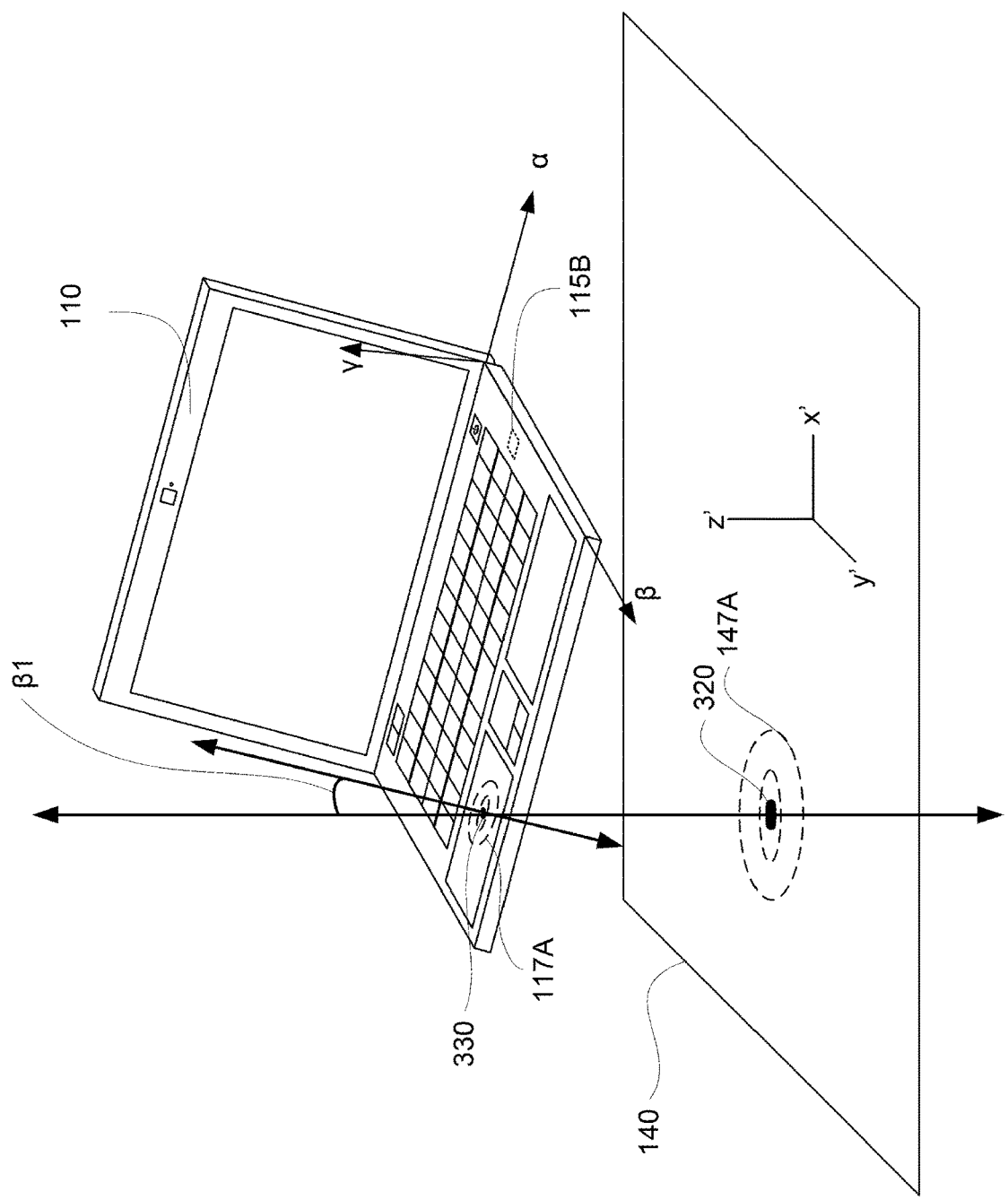
FIG. 6 illustrates an example of determining an orientation of the computing device relative to the wireless charger of FIG. 4 in accordance with aspects of the disclosure.

Thus, in other instances, to further improve accuracy of the alignment vector, processors 112 may additionally determine an orientation of the computing device 110 relative to the wireless charger 140, and determine the alignment vector further based on the orientation of the computing device 110. FIG. 6 shows an example of determining an orientation of a computing device relative to a wireless charger in accordance with aspects of the disclosure. FIG. 6 also shows computing device 110 and wireless charger 140, along with their respective receiver coil 117A and transmitter coil 147A. In FIG. 6, the one or more sensors may include a gyroscope 115B of the computing device 110, such as a three-axis gyroscope that can measure roll ($\alpha$-axis), pitch ($\beta$-axis), and yaw ($\gamma$-axis) angles and/or angular velocities of the computing device 110. In other words, the rotation measurements provide orientation information of the computing device 110 with respect to its three rotational axes. Processors 112 may receive the rotation measurements as a time-based series of rotation measurements, where each rotation measurements may be associated with a timestamp provided by a clock of the computing device 110.

Processors 112 may use the received rotation measurements to determine an orientation of the computing device 110 relative to the wireless charger 140. For example as shown, processors 112 may determine that computing device 110 is at a pitch angle of ($31 with respect to the $\beta$-axis. Further as shown, the rotational axes may be chosen to correspond to the x, y, and z-axes of the computing device 110 such that $\alpha$-axis corresponds to x-axis, $\beta$-axis corresponds to y-axis, and $\gamma$-axis corresponds to z-axis. For wireless chargers with a flat top surface such as the wireless charger 140 shown, processors 112 may then determine that, due to the pitch angle of $\beta1$, x-axis of computing device 110 is offset by an angle of $\beta1$ with respect to x'-axis of wireless charger 140, and that z-axis of computing device 110 is offset by an angle of $\beta1$ with respect to z'-axis of wireless charger 140.

As such, processors 112 may first transform the reference vector into values corresponding to the coordinate system of the wireless charger 140 before determining the alignment vector. For example referring back to FIG. 5, processors 112 may first transform reference vector 510 from [t1; x1, y1, z1] with respect to x, y, z-axes into [t1; x1', y1', z1'] with respect to x', y', z'-axes. Processors 112 may then determine a location of the transformed reference vector in the pattern 310. Based on the location of the transformed reference vector, an alignment vector may be determined that takes into account of the orientation information of the computing device 110.

Further, processors 112 may determine change in orientation of the computing device 110 based on the rotational measurements. Continuing from the example above, if at time t2, the pitch angle changes from $\beta1$ to $\beta2$, processors 112 may determine that computing device 110 is being spun around with respect to the $\beta$-axis. In some instances, processors 112 may correlate the acceleration measurements and the rotational measurements in order to separate linear motion from angular motion. For example, processors 112 may determine values including linear displacements, linear velocities, linear accelerations, angular rotations, angular velocities, angular accelerations, etc., which processors 112 may use in the determination of the alignment vector.

Referring back to FIG. 4, once the alignment vector is determined, processors 112 may generate an output guiding movement of the computing device 110 to align with the wireless charger 140. As shown, an example output 450 may be a graphical representation of the relative positions of the center 320 of transmitter coil 147A and the center 330 of the receiver coil 117A, and the alignment vector 540. Further as shown, the output 450 may include texts instructing the user 210 to move the computing device 110 in a direction of the alignment vector 540. Though not shown, the output 450 may further include texts or graphics instructing the user 210 to rotate the computing device 110 so that the receiver coil 117A is on a parallel plane as transmitter coil 147A. In other examples such as those described further below, the output may additionally or alternatively include other graphics and/or texts, as well as other types of output, such as audio, haptic, etc.

Processors 112 may continue to monitor the relative positions of the transmitter coil 147A and the receiver coil 117A, and continue to generate instructions until proper charging alignment is reached. For instance, based on the instruction in output 450, the user 210 may move the computing device 110, and the processors 112 may continue to receive motion data and charging data. Based on the motion data and charging data, processors 112 may determine whether proper charging alignment has been reached, such as whether the charging alignment meets a predetermined threshold. One example predetermined threshold may be meeting a 90% of a maximum charging rate possible with a given wireless charger. Another example predetermined threshold may be having less than 1 cm offset between the center 320 of the transmitter coil 147A and the center 330 of the receiver coil 117A. In instances where processors 112 determine that the user's movement does not place the two coils in proper alignment, processors 112 may determine a new alignment vector and generate a new output following the same example process as described above.

As an alternative or in addition to determining an alignment vector and output guiding movement of the computing device 110 based on the alignment vector, processors 112 may determine whether a recent movement direction of the user causes an increase or a decrease in charging rate, and generate an output based on that determination. For example, processors 112 may determine that, at the end of a recent movement represented by displacement vector [t1; x1, y1, z1], the charging rate changed from R1 to R2. Processors 112 may compare R1 with R2, and may generate an output that either instructs the user to continue moving in that direction or instead move in an opposite direction. For example, if R2 is greater than R1, processors 112 may generate an output instructing the user to keep moving in the same direction. For another example, if R2 is less than R1, processors may generate an output instructing the user to move in the opposite direction.

Processors 112 may repeat this process until alignment between the transmitter coil 147A and the receiver coil 117A meets a predetermined threshold. As such, processors 112 may assist the user in reaching proper alignment in a similar fashion as a "hotter-colder" game. Such a process may be particularly useful when, as mentioned above, where the charger 140 and/or the computing device 110 is not designed for wireless charging according to a standard. Further, since the user's subsequent movement of computing device 110 based on the instruction is unlikely to be in exactly the same or exactly the opposite direction as the alignment vector, subsequent determinations by the processors 112 may fine tune the alignment. For example, based on a movement of computing device 110 in a direction along the x-axis that increases charging rate, processors 112 may generate an output instructing the user to continue to move in that direction along the x-axis. However, when the user 210 continues to move computing device 110 in the direction along the x-axis, the user 210 may also inadvertently move the computing device 110 slightly in a direction along the y-axis, which decreases the charging rate. Based on this, processors 112 may generate an output instructing the user 210 to continue moving in the same direction along the x-axis, but also to move in the opposite direction along the y-axis.

In another aspect, in the instance where the user consents to the use of such data, past motion data may be used to train one or more models to further assist charging alignment. The model may be any type of a machine learning model. For example, the model may be a neural network or a decision tree model. For another example, the model may be a regression model or a classifier model. For instance, processors 112 may receive past motion data capturing motions of the computing device 110 as the computing device 110 is being set down on surfaces. The past motion data may be used to train the model in an unsupervised manner, for example with the past motion data as training input, with no training output. Alternatively the model may be trained in a supervised or semi-supervised manner, for example, the past motion data may be used as training input, and patterns and/or vectors determined and/or verified by humans may be used training output. In instances where the processors 112 receive other types of data in addition to motion data, such additional data may be used to further train the model.

For instance, processors 112 may train a model to predict movement of the computing device 110 when being placed down on a wireless charger. For example, the model may be trained to recognize that the user 210 tends to place the computing device 110 down with movement in a certain direction, such as from the left to the right. For another example, the model may be trained to predict that, if the user 210 starts to set down the computing device 110 in a direction away from the user 210, the user 210 will eventually set down the computing device 110 at least a certain distance away from the user 210. For still another example, the model may be trained to predict one or more vectors that represent a predicted movement of the computing device 110 as the computing device 110 is being set down on a surface, such as on a surface of a wireless charger.

The trained model may be stored on computing device 110, such as in memory 114, so that processors 112 may access the trained model when determining charging alignment. For instance, before the user 210 starts to set down the computing device 110, processors 112 may use the trained model to predict that the user 210 will place the computing device 110 down about 10 cm left from the user 210. As such, processors 112 may generate an output instructing the user 210 to position the computing device 110 based on this prediction. This way, processors 112 may assist the user 210 before receiving all the motion data and charging data necessary for determining an alignment vector. For another instance, while the user 210 is setting down the computing device 110, processors may predict a movement vector of the computing device 110 using the trained model, and may determine an alignment vector based on the predicted movement vector.

Figure 7:
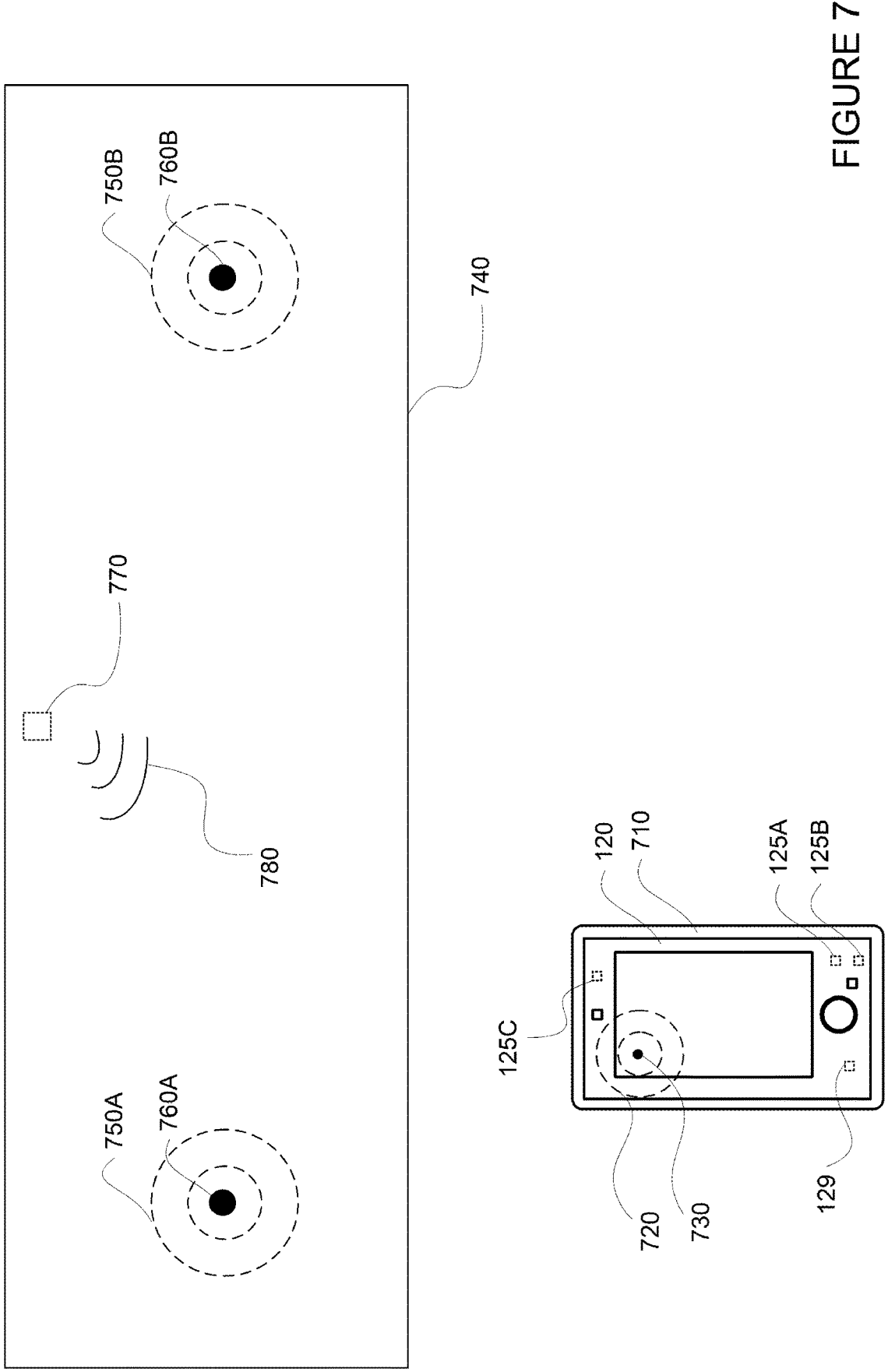
FIG. 7 illustrates another example of aligning a computing device to a wireless charger using motion data and other data in accordance with aspects of the disclosure.

FIG. 7 shows another example of determining charging alignment based on motion data and charging data in accordance with aspects of the disclosure. In this example shown, the wireless charger 740 includes multiple transmitter coils, labeled as 750A and 750B, but may otherwise be configured similarly as wireless charger 140. Each of the two transmitter coils 750A and 750B have their respective centers labeled as 760A and 760B. Further in this example, the user 210 is aligning computing device 120, which is shown as a mobile phone, to the wireless charger 740. The computing device 120 in this example does not have wireless charging capabilities. Rather, the wireless charging capabilities are provided by an accessory, shown as a cover 710 in which computing device 120 is fitted. For instance, the cover 710 may include a receiver coil 720 with a center 730, and may have a conductive element for transferring energy from the receiver coil 720 to computing device 120, such as a wire, a contact, or a dongle.

Even though the receiver coil 720 is located in the cover 710 instead of computing device 120, processors 122 of computing device 120 may determine alignment between receiver coil 720 of cover 710 and either transmitter coil 750A or 750B following the same processes as described above with respect to FIGS. 4, 5, and 6, so long as the cover 710 is attached to the computing device 120 such that the receiver coil 720 moves along with the computing device 120. For instance, processors 122 may receive motion data from one or more sensors, such as accelerometer 125A and gyroscope 125B, and may receive charging data from charging system 127. For another instance, one or more reference vectors and alignment vectors may be determined based on the motion data and charging data as described above.

FIG. 7 further illustrates that processors 122 may additionally or alternatively use other types of sensor data in determining alignment between the receiver coil 720 of cover 710 and either transmitter coil 750A or 750B. For instance, the one or more sensors 125 of the computing device 120 may include additional sensors. For example, the additional sensors may be one or more visual sensors, such as a camera 125C. Alternatively or additionally, the one or more sensors 125 may further include optical sensors, such as an infrared sensor. In this regard, processors 122 may receive image data from the camera 125C capturing the wireless charger 740. For instance, the received image data may be a time-based series of image data, such as a series of frames or images each associated with a timestamp provided by a clock of the computing device 120.

Processors 122 may use the image data for generating output guiding movement of the computing device 120. For instance, processors 122 may use pattern or object recognition models, such as machine learning models, to recognize the wireless charger 740 in the received image data. Processors 122 may then determine relative positions of the computing device 120 and the wireless charger 740 based on the recognized wireless charger 740 in the image data. Processors 122 may also track the relative positions of the computing device 120 and the wireless charger 740 as the computing device 110 is moved by the user 210 based on the image data.

As such, processors 122 may generate output guiding movement of the computing device 120 based on the relative positions determined using the image data. For instance, the output may include may be generated in a similar fashion as the "hotter-colder" game described above. For example, processors 122 may instruct the user 210 to move computing device 120 in a certain direction based on the relative positions determined using image data. Processors 122 may then determine based on image data whether computing device 120 is moving closer to the wireless charger 740, and generate further instructions accordingly until a predetermined threshold is met.

Using the image data to generate output instructions may be advantageous in a number of ways. For instance, processors 122 may be able to recognize and locate wireless charger 740 based on the image data even when computing device 120 is at a distance where receiver coil 720 is not close enough to be engaged by either of the transmitter coils 750A or 750B. As such, processors 122 may generate an output guiding movement of the computing device 120 towards the wireless charger 740 even before the processors 122 can determine alignment based on charging data.

For another instance, processors 122 may further recognize based on the image data that the wireless charger 740 includes two transmitter coils 750A and 750B, which may not be possible based on detecting emitted electromagnetic energy. For example, markings may be provided on the top surface of the wireless charger 740 showing positions of the transmitter coils 750A and 750B. For another example, markings may be provided on the top surface of the wireless charger 740 showing positions of the center 760A and the center 760B. As such, processors 122 may determine that transmitter coil 750A is closer to the computing device 120 than transmitter coil 750B based on the image data. Based on the relative positions of the two transmitter coils 750A and 750B, processors 122 may generate an output instructing the user to move towards the transmitter coil 750A identified as closest to the computing device 120.

In the instance where the user consents to the use of such data, FIG. 7 further illustrates that computing device 120 may use signal strength measurements in determining charging alignment. In this regard, signal strength measurements are likely already being used by computing device 120 and/or wireless charger 740 for establishing and/or maintaining connections. For instance, communication module 129 of computing device 120 may measure signal strengths of the communication link 780 between computing device 120 and wireless charger 740. For example, the signal strength may be RSS measurements for Bluetooth® connection. Each signal strength measurement may be associated with a timestamp provided by a clock of computing device 120, and as such, processors 122 may receive from communication module 129 a time-based series of signal strength measurements. Alternatively or additionally, the signal strength may be measured by communication module 770 of the wireless charger 740, and sent to the processors 122.

For instance, processors 122 may determine a distance between the computing device 120 and the wireless charger 740 based on the signal strength measurements. As with image data, processors 122 may be able to recognize and locate wireless charger 740 based on signal strength measurements when computing device 120 is at a distance where receiver coil 720 is not close enough to be engaged by either of the transmitter coils 750A or 750B. For instance, for many communication systems such as Bluetooth®, signal strength may drop with increasing distance between two devices. For example, the signal strength pattern from a Bluetooth® device may be represented by a series of concentric rings, where each ring is a predetermined distance from the device, and each ring has a known signal strength value. As such, based on the value of the signal strength measurement, processors 122 may determine a distance between computing device 120 and the wireless charger 740.

As such, processors 122 may generate output guiding movement of the computing device 120 based on the distance determined using the signal strength measurements, such as in a similar fashion as the "hotter-colder" game described above. For example, processors 122 may instruct the user 210 to move computing device 120 by the distance determined using signal strength measurements. Processors 122 may then determine based on signal strength measurements whether computing device 120 is moving closer to the wireless charger 740, and generate further instructions accordingly until a predetermined threshold is met.

Although determining charging alignment using motion data and charging data, image data, and signal measurements are described separately in the examples above, any of a number of combinations of the various types of data described above may be used for determining charging alignment. For example, the motion data, charging data, and image data may be used in combination while determining alignment vector. Further, although the examples of FIGS. 4-7 describe some types of sensor data, other types of data may be used additionally or alternatively.

Figure 8:
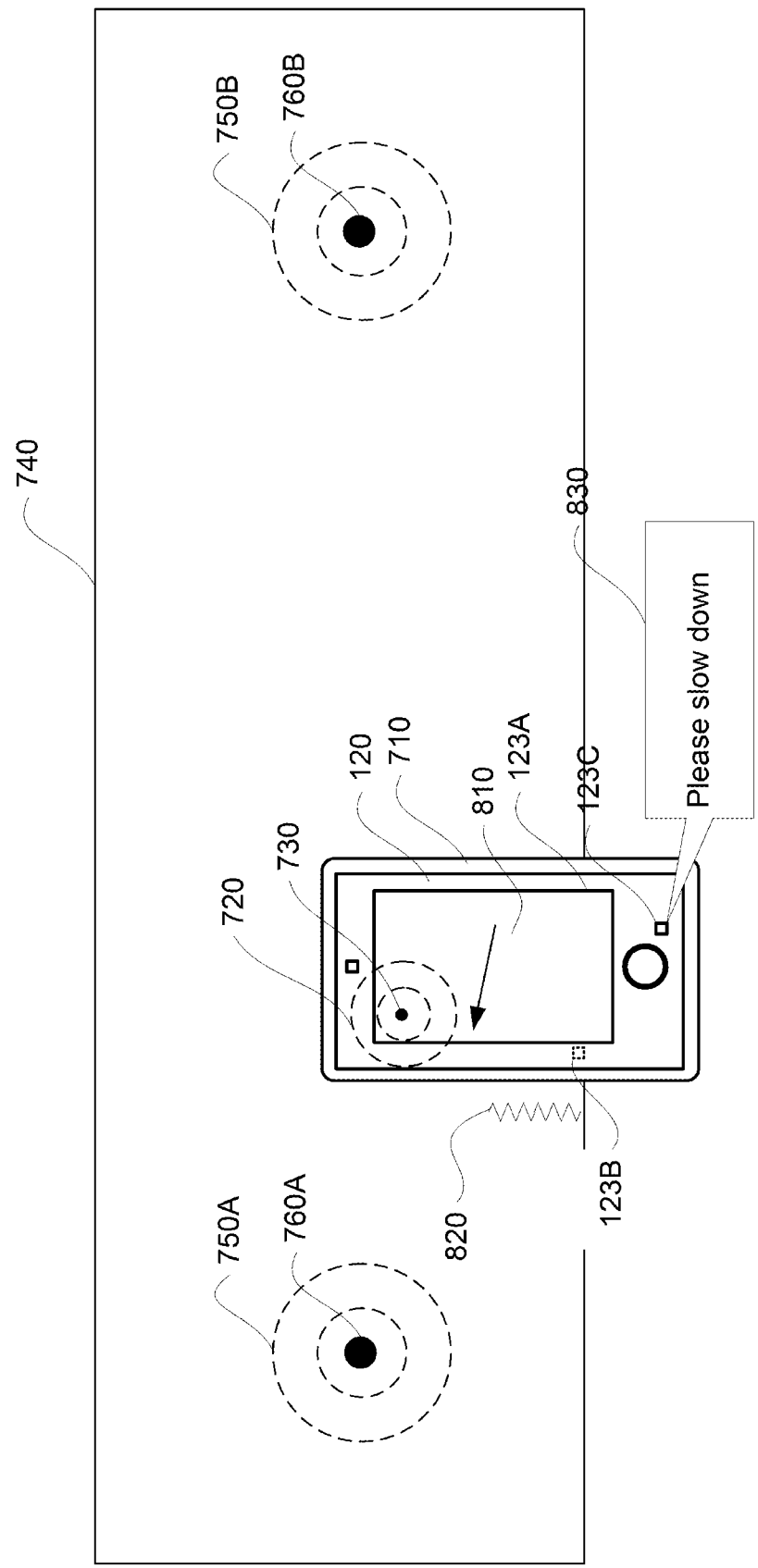
FIG. 8 illustrates additional examples of output for assisting a user with charging alignment between the computing device and the wireless charger of FIG. 7 in accordance with aspects of the disclosure.

Still further, FIG. 8 shows other examples of output that can be used to guide movement of a computing device to a wireless charger in accordance with aspects of the disclosure. FIG. 8 also shows computing device 120 and cover 710 with various features described above with respect to FIG. 7, as well as wireless charger 740 with various features described above with respect to FIG. 7. FIG. 8 further shows that computing device 120 includes a display 123A as an output device, as well as other output devices, such as haptic interface 123B and speaker 123C. As shown, the display 123A may show a graphical representation 810, which as shown in this example may be an arrow pointing in a direction of the alignment vector. Further as shown, the haptic interface 123B may produce a haptic output 820, such as a vibration, in a direction of the alignment vector. For another example, the speaker 123C may produce an audio output 830, such as an audio instructing the user to slow down as shown in this example, or to move the computing device 120 in a direction of the alignment vector.

Any of a number of output devices may be used to generate any of a number of outputs for guiding movement of a computing device during charging alignment. For instance, in the example of FIGS. 4-6, where the computing device 110 is relatively large, visual displays may be advantageous since the display 113A of computing device 110 may be easy to view and to follow. For another instance, in the example of FIGS. 7 and 8, where the computing device 120 is relatively small, haptic output and audio output may be advantageous since the display 123A may be small, and the user 210 may be more sensitive to haptic output from a smaller handheld computing device.

Although in the descriptions above, processors 112 of computing device 110 (or processors 122 of computing device 120) may receive data and make various determinations for charging alignment, alternatively, processors remote to the computing device 110 (or computing device 120) may be configured to receive the data and make the determinations. For instance, processors 132 of server computing device 130 may receive sensor data, such as motion data, and charging data from the computing device 110. Processors 132 may then determine reference vectors, associated charging rates, alignment vectors, etc., as described above. Processors 132 may also generate the output for instructing the user and send the output to computing device 110 so that computing device 110 may display the output to the user. For another instance, the models described above may be trained on the server computing device 130. Processors 132 may receive past motion data from computing device 110 and store in memory 136. The past motion data may then be used by processors 132 to train a model for predicting user's motion when setting down computing device 110. The trained model may then be stored in memory 134 for later use by processors 132 in predicting user motion. In some instances, computing device 130 may send the trained model to computing device 110 for user in predicting user motion.

Figure 9:
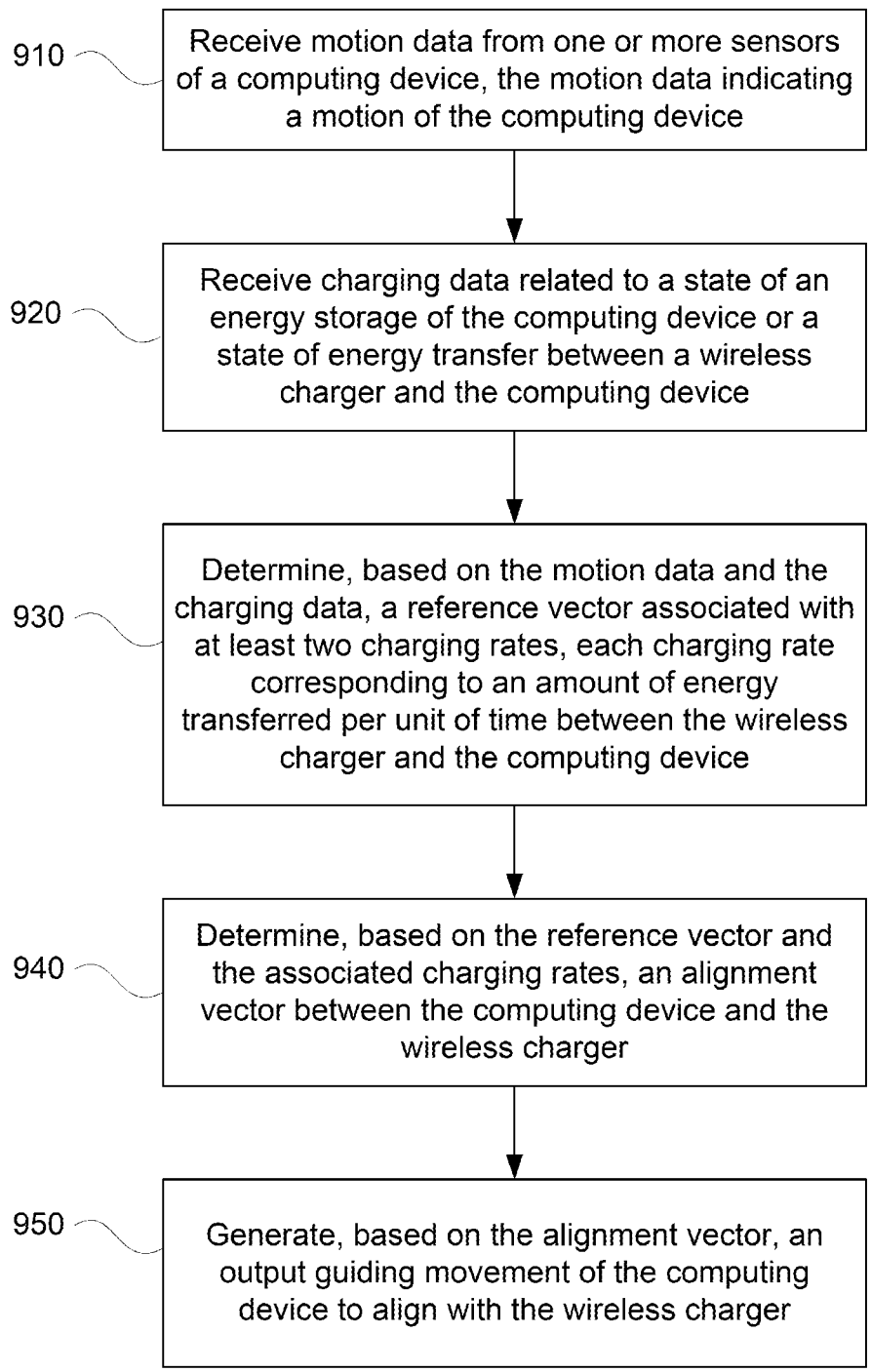
FIG. 9 is a flow diagram in accordance with aspects of the disclosure.

FIG. 9 shows an example flow diagram that may be performed by one or more processors, such as one or more processors 112 of computing device 110. For example, processors 112 of computing device 110 may receive data and make various determinations as shown in the flow diagram. For another example, processors 132 of server computing device 130 may receive data and make various determinations as shown in the flow diagram. Referring to FIG. 9, in block 910, motion data may be received from one or more sensors of a computing device, the motion data indicating a motion of the computing device. In block 920, charging data related to a state of an energy storage of the computing device or a state of energy transfer between a wireless charger and the computing device may be received. In block 930, a reference vector associated with at least two charging rates may be determined based on the motion data and the charging data, each charging rate corresponding to an amount of energy transferred per unit of time between the wireless charger and the computing device. In block 940, based on the reference vector and the associated charging rates, an alignment vector between the computing device and the wireless charger may be determined. In block 950, an output guiding movement of the computing device to align with the wireless charger may be generated based on the alignment vector.

The technology is advantageous because it allows a system to assist a user to accurately align a computing device with a wireless charger. With better alignment, greater charging rate may be achieved, making the charging process more energy efficient. The system may determine charging alignment for the computing device to wireless chargers of any of a number of shapes or sizes. Further, the system may determine charging alignment even when the wireless charging capability is provided by an accessory of the computing device, such as a cover or holder. The technology further provides for training models to predict motions of the user when setting down the computing device for wireless charging, which may further increase the speed and accuracy of the alignment process.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   receiving, by one or more processors, acceleration data from one or more sensors of a computing device, the acceleration data indicating a motion of the computing device;
   determining, by one or more processors, respective charging rates between a wireless charger and the computing device at two different times, each of the charging rates being a rate of energy transfer;
   determining, by one or more processors, an alignment vector between the computing device and the wireless charger based, at least in part, on a subset of the acceleration data that is correlated with at least one of the two different times at which the charging rates are determined; and
   generating, by one or more processors based on the alignment vector, an output for guiding movement of the computing device to align with the wireless charger.

2. The method of claim 1, further comprising:
   determining, by one or more processors, displacements of the computing device relative to a prior position of the computing device based on the acceleration data.

3. The method of claim 1, wherein the acceleration data includes rotation measurements for the motion of the computing device.

4. The method of claim 3, further comprising:
   determining, by one or more processors, orientation information associated with the computing device based on the rotation measurements, wherein determining the alignment vector is further based on the orientation information.

5. The method of claim 1, wherein the alignment vector relates a position of a charging system of the computing device to a position of a charging system of the wireless charger.

6. The method of claim 1, wherein the alignment vector relates a center of a receiver coil of the computing device to a center of a transmitter coil of the wireless charger.

7. The method of claim 1, further comprising:
receiving, by one or more processors, other acceleration data indicating a previous motion of the computing device being placed onto a surface; and
training, by one or more processors based on the other acceleration data, one or more models for predicting movement vectors for the computing device when being placed onto the surface.

8. The method of claim 7, further comprising:
predicting, by one or more processors using the one or more models, a movement vector for the computing device as the computing device is being placed by onto the wireless charger, wherein determining the alignment vector is further based on the predicted movement vector.

9. The method of claim 1, wherein the output includes a graphical representation of relative positions of the computing device and the wireless charger, and the alignment vector.

10. The method of claim 1, wherein the output includes a haptic output in a direction of the alignment vector.

11. The method of claim 1, wherein the output includes an audio instruction.

12. The method of claim 1, further comprising:
receiving, by one or more processors, image data from the one or more sensors;
recognizing, by one or more processors based on the image data, the wireless charger; and
determining, by one or more processors based on the image data, a relative position of the wireless charger to the computing device, wherein determining the alignment vector is further based on the relative position of the wireless charger to the computing device.

13. The method of claim 1, further comprising:
receiving, by one or more processors, signal strength measurements for a wireless connection between the wireless charger and the computing device; and
determining, by one or more processors based on the signal strength measurements, a relative position of the wireless charger to the computing device, wherein determining the alignment vector is further based on the relative position of the wireless charger to the computing device.

14. The method of claim 1, further comprising:
determining, by one or more processors, that the wireless charger includes a plurality of charging systems; and
identifying, by one or more processors, one of the plurality of charging systems being closest to the computing device, wherein determining the alignment vector is further based on the identified charging system closest to the computing device.

15. A system, comprising one or more processors configured to:
receive acceleration data from one or more sensors of a computing device, the acceleration data indicating a motion of the computing device;
determine respective charging rates between a wireless charger and the computing device at two different times, each of the charging rates being a rate of energy transfer;
determine an alignment vector between the computing device and the wireless charger based, at least in part, on a subset of the acceleration data that is correlated with at least one of the two different times at which the charging rates are determined; and
generate, based on the alignment vector, an output for guiding movement of the computing device to align with the wireless charger.

16. The system of claim 15, further comprising:
the one or more sensors, wherein the one or more sensors include at least one of:
an accelerometer,
a gyroscope, and
an optical sensor.

17. The system of claim 15, further comprising:
a communication module configured to measure a signal strength for a connection between the computing device and the wireless charger;
wherein the one or more processors are further configured to:
receive, from the communication module, signal strength measurements for the connection between the computing device and the wireless charger; and
determine a relative position of the wireless charger to the computing device, wherein the determination of the alignment vector is further based on the relative position of the wireless charger to the computing device.

18. The system of claim 15, further comprising:
one or more output devices, wherein the one or more output devices include at least one of: a display, a haptic interface, and a speaker.

19. The system of claim 15, wherein the one or more processors are further configured to:
receive other acceleration data indicating a previous motion of the computing device being placed onto a surface; and
train, based on the other acceleration data, one or more models for predicting movement vectors for the computing device when being placed onto the surface.

* * * * *